Feb. 14, 1928.
J. S. THOMPSON
FRICTION BRAKE
Filed March 9, 1926
1,659,061
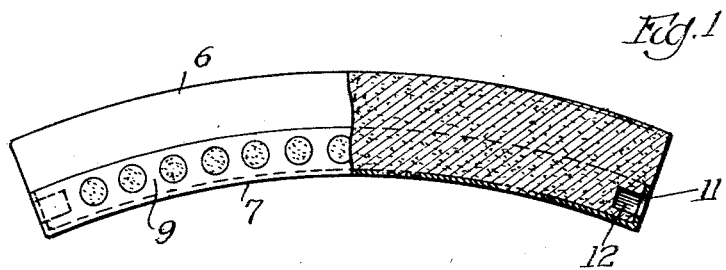
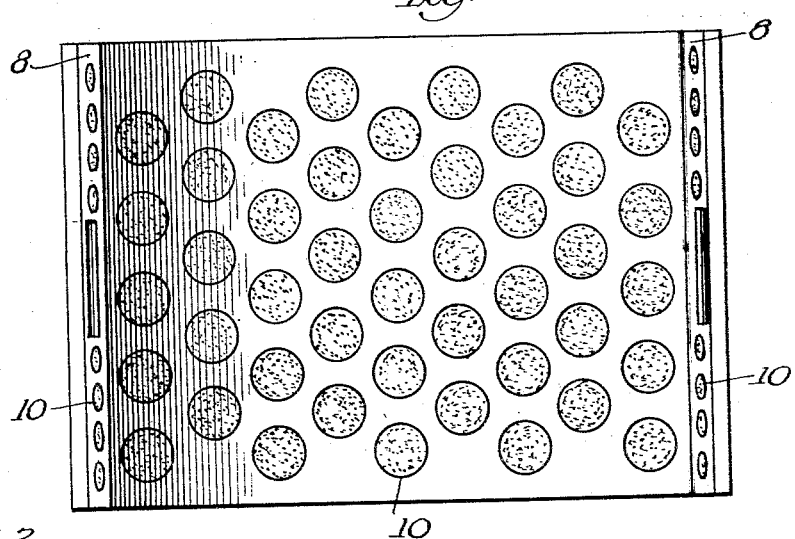
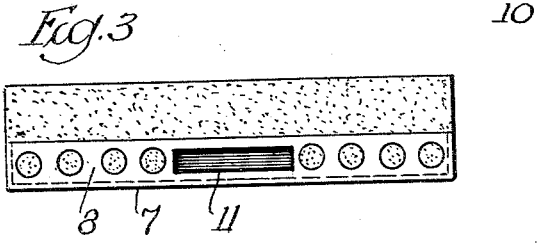
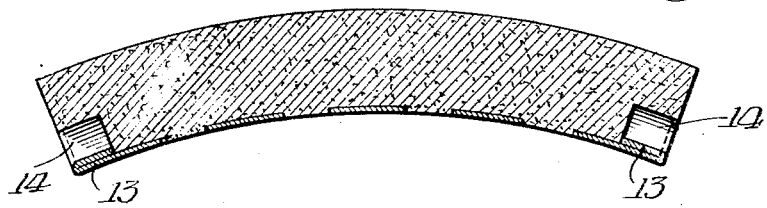
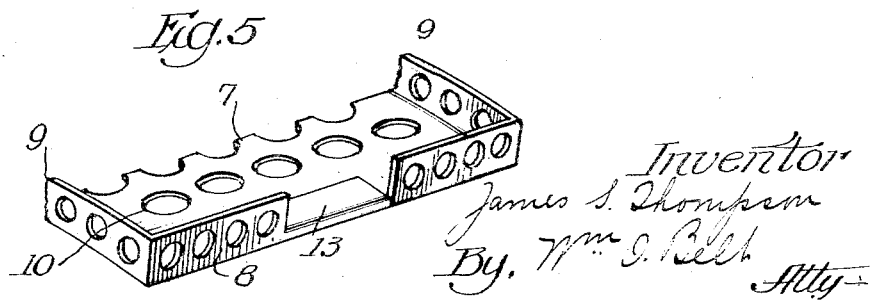
Inventor
James S. Thompson
By Wm. G. Belt
Atty.

Patented Feb. 14, 1928.

1,659,061

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed March 9, 1926. Serial No. 93,387.

This invention relates generally to friction brakes and more particularly to the provision of a novel shoe for braking a moving member by frictional contact therewith. There are many different kinds of brake assemblies in which a shoe of this type may be employed, including the internal expanding brakes and the external contracting brakes for automotive vehicles. In a companion application filed March 3, 1926, Serial No. 92,048, I have shown a shoe of this construction embodied in an expanding brake for automotive vehicles.

The object of the invention is to provide an efficient shoe for a friction brake having means whereby it can be easily and quickly installed or replaced on a head, band or other support.

A further object of the invention is to provide a composition shoe with recesses therein to receive means for fastening the shoe upon a support.

In the accompanying drawings I have selected embodiments of the invention and referring thereto;

Fig. 1 is a side view of the shoe partly in section.

Fig. 2 is a bottom plan view of the shoe.

Fig. 3 is an end view of the shoe.

Fig. 4 is a longitudinal sectional view showing another embodiment of the invention.

Fig. 5 is a perspective view of an end portion of the shoe shown in Fig. 2.

The body 6 of the shoe is made of a suitable composition which will provide friction sufficient for the intended purpose and which is wear and heat resistant. I do not claim the composition in this application because the invention herein claimed is not restricted to the use of a particular composition, but is capable of use with a body formed of any composition suitable for the intended purpose. One or more compositions may be better than others and yet the others may, so far as the present invention is concerned, be entirely satisfactory and efficient for many purposes. Therefore, I do not restrict myself in this application to the use of any particular composition so long as it is capable of producing satisfactory results for the intended purpose. The shoe is concavo-convex in form and it is provided with a metal back which is made fast to the concave back of the body. I have found it convenient and satisfactory to make this back in the form of a hollow shell 7 which is perforated to receive portions of the body composition. The shell is made a fixed and permanent part of the shoe by embedding the body therein under pressure and I prefer to provide the ends 8 and also the sides 9 as well as the back of the shell, with perforations 10 to receive portions of the composition body.

At opposite parts of the shoe, preferably in the ends thereof, I provide recesses to receive fastening means whereby the shoe may be secured to its support. These recesses comprise slots 11 in the ends of the shell registering with recesses 12 in the body of the shoe. The walls of the slot 11 form a protection for the walls of the recess to resist wear of the fastening means.

In Figs. 4 and 5 I have shown a slightly different embodiment of the invention wherein, instead of providing the ends of the shell with slots 11, as in Figs. 1-3, I cut and turn down sections 13 of the ends inwardly upon the back of the shell, thus providing a double thickness of metal at the bottom of the recesses 14 to receive the fastening devices.

My invention provides a shoe having means which do not project beyond the margin of the shoe body, for securing the shoe to its support, and these means are of strong and substantial character which will form a secure anchorage for the fastening devices.

So far as the present invention is concerned it is not necessary that the shell should be perforated or that the shell should have sides, but it is desirable to locate the recesses adjacent the back of the shoe so that the face of the shoe may be worn down without contacting with the fastening devices, and also to utilize the metal of the back as a reinforcement for the recesses in the shoe. I have found it convenient and satisfactory to make the shoe as shown in the drawings, but I do not restrict myself to the particular disclosures herein and reserve the right to make all such changes as fairly fall within the scope of the following claims.

I claim:

1. As a new article of manufacture, a friction brake shoe having enclosed recesses in its end walls to receive means for securing the shoe to a support.

2. As a new article of manufacture, a friction brake shoe comprising a composition body having recesses in its ends to receive means for securing the shoe to a support.

3. As a new article of manufacture, a friction brake shoe comprising a body having a convex friction contact face and a concave back face, and enclosed recesses in the end walls of the shoe adjacent the back face to receive means for securing the shoe to a support.

4. As a new article of manufacture, a friction brake shoe comprising a composition body, and a metal shell secured on the back thereof, said shoe having recesses in its ends extending through portions of the shell.

5. As a new article of manufacture, a friction brake shoe comprising a composition body having a metal shell secured on the back of the body, said shell having ends and said shoe having recesses extending through the ends of the shell.

6. As a new article of manufacture, a friction brake shoe comprising a composition body and a metal shell secured on the back thereof, said shell having ends and said shoe having recesses extending through the ends of the shell and located adjacent the back of the shoe.

7. As a new article of manufacture, a friction brake shoe comprising a composition body, and a metal shell secured on the back thereof, said body having recesses in its ends and said shell having ends with portions thereof bent down upon the back of the body within said recesses.

JAMES S. THOMPSON.